United States Patent [19]
Betensky

[11] Patent Number: 5,900,993
[45] Date of Patent: May 4, 1999

[54] LENS SYSTEMS FOR USE IN FINGERPRINT DETECTION

[75] Inventor: Ellis Betensky, Toronto, Canada

[73] Assignee: Cross Check Corporation, North Palm Beach, Fla.

[21] Appl. No.: 08/854,157

[22] Filed: May 9, 1997

[51] Int. Cl.$^6$ .................................................. G02B 13/18
[52] U.S. Cl. ............................................ 359/710; 356/71
[58] Field of Search ..................................... 359/663, 710; 356/71

[56] References Cited

U.S. PATENT DOCUMENTS

| | | | |
|---|---|---|---|
| 2,500,017 | 3/1950 | Altman | 359/710 |
| 3,200,701 | 8/1965 | White . | |
| 3,482,498 | 12/1969 | Becker . | |
| 3,527,535 | 9/1970 | Monroe . | |
| 3,947,128 | 3/1976 | Weinberger et al. . | |
| 3,968,476 | 7/1976 | McMahon . | |
| 4,063,226 | 12/1977 | Kozma et al. | 356/125 |
| 4,210,899 | 7/1980 | Swonger et al. . | |
| 4,414,684 | 11/1983 | Blonder . | |
| 4,544,267 | 10/1985 | Schiller . | |
| 4,681,435 | 7/1987 | Kubota et al. . | |
| 4,792,226 | 12/1988 | Fishbine et al. . | |
| 4,924,085 | 5/1990 | Kato et al. . | |
| 5,222,152 | 6/1993 | Fishbine et al. . | |
| 5,233,404 | 8/1993 | Lougheed et al. . | |
| 5,416,573 | 5/1995 | Sartor, Jr. . | |
| 5,548,394 | 8/1996 | Giles et al. | 356/71 |

FOREIGN PATENT DOCUMENTS

| | | |
|---|---|---|
| 2 089 545 | 6/1982 | United Kingdom . |
| WO 92/11608 | 7/1992 | WIPO . |

OTHER PUBLICATIONS

Bahuguna et al., "Prism fingerprint sensor that uses a holographic optical element," *Applied Optics*, vol. 35, pp. 5242–5245, Sep. 1996.

Hebert, Robert T., "Off–axis optical elements in integrated, injection–molded assemblies," *SPIE*, vol. 2600, pp. 129–134, Dec. 1995.

Stoltzmann et al., "Versatile anamorphic electronic fingerprinting: design and manufacturing considerations," *SPIE*, vol. 2537, pp. 105–116, Aug. 1995.

*Primary Examiner*—Georgia Y. Epps
*Assistant Examiner*—Michael A. Lucas
*Attorney, Agent, or Firm*—Maurice M. Klee

[57] ABSTRACT

Lens systems for use in fingerprint detection systems employing frustrated total internal reflection are provided. The systems include an aperture stop and three lens units. The first lens unit has a positive power, is located on the object side of the aperture stop, and forms a telecentric pupil for the lens system. The second lens unit has a positive power, is located on the image side of the first lens unit, and forms a real image of the object. In certain embodiments, the third lens unit is located between the first and second lens units and has substantially afocal cylindrical power. In other embodiments, the third lens unit serves to correct the field curvature of the image contributed by the first and second lens units.

18 Claims, 9 Drawing Sheets

LENS SYSTEMS FOR USE IN FINGERPRINT DETECTION

FIELD OF THE INVENTION

This invention relates to lens systems and, in particular, to lens systems for use in fingerprint detection where an image of fingerprint ridges is produced by means of frustrated total internal reflection at the tilted face of a prism.

BACKGROUND OF THE INVENTION

A description of some of the problems involved in fingerprint detection using frustrated total internal reflection can be found in Stoltzmann et al., "Versatile anamorphic electronic fingerprinting: design and manufacturing considerations," SPIE, Vol. 2537, pages 105–116, August 1995. These authors conclude that the optical system used to form the image of the fingerprint ridges should include prisms for correcting optical distortion. In practice, an optical system employing prisms is expensive to manufacture compared to an optical system employing only lens elements, both because prisms themselves are expensive and because collimating optics are required to avoid introducing aberrations.

Significantly with regard to the present invention, Stoltzmann et al. specifically teach away from the use of an optical system employing only lens elements to produce an image of fingerprint ridges. In particular, they state that a system employing cylindrical lenses cannot successfully correct for high levels of horizontal/vertical compression.

As an alternative to distortion correcting prisms, Bahuguna et al., "Prism fingerprint sensor that uses a holographic optical element," Applied Optics, Vol. 35, pages 5242–5245, September 1996, describe using a holographic optical element to achieve total internal reflection without tilting the object (fingerprint ridges), thus allowing a rectilinear image of the object to be produced using only lens elements. The use of a holographic optical element, of course, increases the cost and complexity of the optical system.

Hebert, Robert T., "Off-axis optical elements in integrated, injection-molded assemblies," SPIE, Vol. 2600, pages 129–134, December 1995, describes another approach to the fingerprint detection problem, namely, the use of off-axis optics to avoid tilting the object. This approach requires the use of complex optical surfaces which are difficult to manufacture economically.

DESCRIPTION OF THE INVENTION

In view of the foregoing, it is an object of the invention to provide improved lens systems for use in fingerprint detection. In particular, it is an object of the invention to provide lens systems which employ only lens elements and do not employ distortion correcting prisms, holographic optical elements, or off-axis optics.

A further object of the invention is to provide inexpensive lens systems for use in fingerprint detection systems. In particular, it is an object of the invention to provide lens systems for use in fingerprint detection which comprise molded lens elements which can be produced in large quantities at low cost.

To achieve these and other objects, the invention in accordance with a first of its aspects provides an optical system having an optical axis, said system forming an image of an object, e.g., fingerprint ridges, and comprising:

(a) a prism having a first surface for contacting the object and a second surface, said first surface being oriented with respect to the optical axis at an angle greater than the angle of total internal reflection of the surface, e.g., at an angle greater than about 42° for a prism composed of BK7 glass;

(b) an aperture stop which is separate from or a part of a lens element;

(c) a first lens unit comprising one or more lens elements, said first lens unit having a positive power and being located between the aperture stop and the prism for forming a telecentric entrance pupil;

(d) a second lens unit comprising one or more lens elements, said second lens unit having a positive power and being located on the image side of the aperture stop, said second lens unit forming a real image of the object, e.g., an image which can be viewed with an electronic detector such as a video camera; and (e) a third lens unit comprising one or more lens elements, said third lens unit being located between the first and second lens units and having a cylindrical optical power which is substantially afocal, i.e., the third lens unit has a very long focal length but not an infinite focal length so that the unit can provide some correction for field curvature.

The first lens unit is preferably a single lens element which is composed of either a high index glass or a plastic material, in which case, at least one surface of the lens element is aspherical. The second lens unit is preferably a single lens element which is composed of either a high index glass or a plastic material, in which case, at least one surface of the lens element is aspherical.

The third lens unit having cylindrical power is preferably a single molded plastic lens element having a substantial thickness, e.g., the lens element preferably has a thickness which is about equal to the lens element's maximum clear aperture. Preferably, one of the optical surfaces of the third lens unit is adjacent to the system's aperture stop, e.g., one of the optical surfaces of the third lens unit is substantially in contact with a mechanical aperture stop. Alternatively, the aperture stop can be formed directly on a surface of the third lens unit.

The cylindrical power of the third lens unit is used to reduce the size of the image in one direction only. In particular, the combination of the tilted first surface of the prism and the telecentric entrance pupil formed by the first lens unit causes the image of the object to be foreshortened in the direction of the tilt of the first surface. The cylindrical power of the third lens unit serves to eliminate this effect by reducing the size of the image in the direction orthogonal to the direction in which the image has been foreshortened. In this way, the final image magnification (image reduction) at the detector is the same in both the direction of the tilt and the direction orthogonal to the tilt.

In addition to reducing the size of the image in the direction orthogonal to the tilt, i.e., in addition to reducing the anamorphosis of the image, the cylindrical power also helps in correcting the field curvature of the image. To achieve this result, the first and second lens units are preferably designed to compensate for astigmatism in a direction perpendicular to the cylindrical power plane.

In accordance with a second of its aspects, the invention provides an optical system having an optical axis, said system forming an image of an object and comprising:

(a) a prism having a first surface for contacting the object and a second surface, said first surface being oriented with respect to the optical axis at an angle greater than the angle of total internal reflection of the surface;

(b) an aperture stop which is separate from or a part of a lens element;

(c) a first lens unit comprising one or more lens elements, said first lens unit having a positive power and being located between the aperture stop and the prism for forming a telecentric entrance pupil;

(d) a second lens unit for forming a real image of the object, said second lens unit comprising one or more lens elements, having a positive power, and being on the image side of the first lens unit; and (e) a third lens unit comprising one or more lens elements, said third lens unit correcting the field curvature of the image contributed by the first and second lens units.

For this second aspect of the invention, the first and second lens units are again each preferably a single lens element which is composed of either a high index glass or a plastic material. As with the first aspect of the invention, when a single lens element composed of plastic is used for the first and/or the second lens unit, that element will have at least one surface which is aspherical.

The third lens unit for correcting field curvature is preferably a single negative meniscus lens element composed of plastic, e.g., a molded plastic element, which is located either in the vicinity of the aperture stop or in the vicinity of the image. The third lens unit preferably includes at least one aspherical surface.

For this second aspect of the invention, correction for the foreshortening introduced by the tilted object as seen from the telecentric entrance pupil can be achieved by processing the image after detection either with electronic hardware or with computer software.

The above lens systems are preferably used with monochromatic light sources, e.g., with LEDs, and thus do not provide color correction. However, color correction can be added to the lenses if desired. For monochromatic illumination, it may be desirable to dye one or more of the lens elements to reject ambient light while transmitting the monochromatic illumination.

BRIEF DESCRIPTION OF THE DRAWINGS

[FIG. 1B is] FIGS. 1B-1 and 1B-2 are schematic drawing drawings of the lens system of FIG. 1A illustrating the orientation of the cylindrical lens element of this system, as viewed from the side and the top, respectively.

The foregoing drawings, which are incorporated in and constitute part of the specification, illustrate the preferred embodiments of the invention, and together with the description, serve to explain the principles of the invention. It is to be understood, of course, that both the drawings and the description are explanatory only and are not restrictive of the invention.

DESCRIPTION OF THE PREFERRED EMBODIMENTS

FIGS. 1A, 1B, 2A, and 3–5 illustrate various lens systems constructed in accordance with the invention. Corresponding prescriptions and performance characteristics appear in Tables 1 to 5, respectively.

SCHOTT designations are used for the glasses employed in the lens systems. Equivalent glasses made by other manufacturers can be used in the practice of the invention. Industry acceptable materials are used for the acrylic elements.

All dimensions given in the tables are in millimeters except where indicated. "Total Track" refers to the distance from the exit surface of the prism to the image. "Maximum Field" is the maximum linear half length of the tilted object projected onto a vertical surface. "Primary Wave" is the monochromatic wavelength used in designing the lens system. The tables are constructed on the assumptions that light travels from left to right in the figures and that the object and the image satisfy the Schleimpflug condition.

The aspheric coefficients set forth in Tables 1, 3, and 5 are for use in the following equation:

$$z = \frac{cy^2}{1 + [1 - (1+k)c^2 y^2]^{1/2}} + Dy^4 + Ey^6 + Fy^8 + Gy^{10} + Hy^{12} + Iy^{14}$$

where z is the surface sag at a distance y from the optical axis of the system, c is the curvature of the lens at the optical axis, and k is a conic constant, which is zero except where indicated in the tables. Instead of using the above equation, the aspheric surface for the lens system of Table 2 is defined by an even power polynomial having the coefficients shown in the table, where r is the distance from the optical axis.

FIG. 1 and Table 1 illustrate a lens system constructed in accordance with the invention which employs a cylindrical lens (L2) for distortion correction. As shown in FIG. 1C, the lens system produces a rectangular image of a rectangular object. In particular, the crosses in this figure are calculated image points while the grid represents the ideal rectilinear image. The field used in producing this figure was 18.5 millimeters wide and 26.2 millimeters high, while the image was 3.6 millimeters wide and 5.1 millimeters high.

FIGS. 2–5 and Tables 2–5 illustrate various lens systems constructed in accordance with the invention which employ only rotationally symmetric lens elements, as opposed to a cylindrical element as in FIG. 1 and Table 1. As illustrated in FIG. 2B, these lens systems produce a square image of a rectangular object. In particular, the field used in producing this figure was 18.5 millimeters wide and 26.2 millimeters high, as in FIG. 1C, but the image, rather than being rectangular, is a square 3.5 millimeters on a side. As discussed above, rectangular data can be obtained from this square image by processing the image after detection either with electronic hardware or with computer software. As in FIG. 1C, the crosses in FIG. 2B are calculated image points while the grid represents the ideal rectilinear image.

Figure 1A:
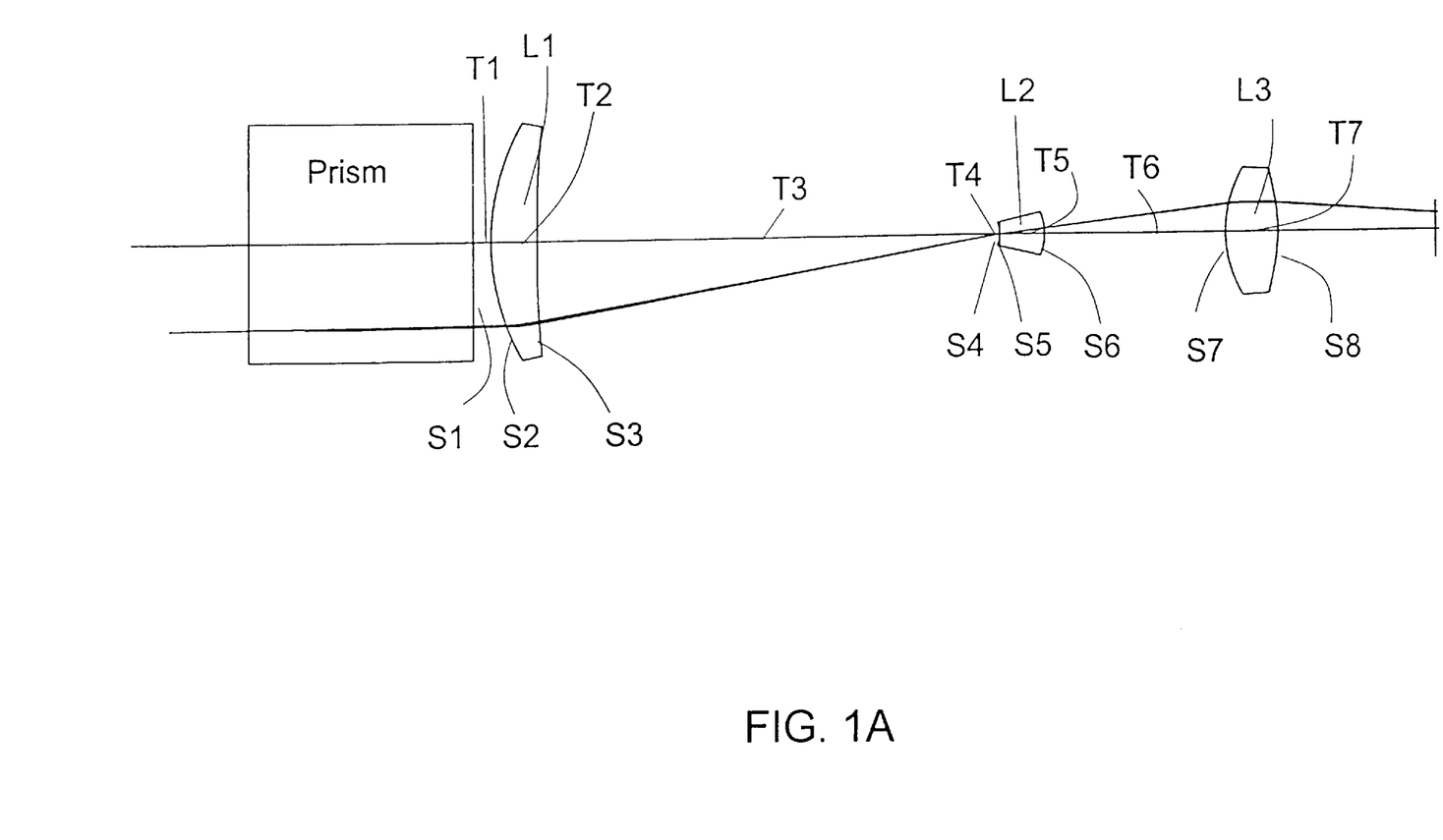
FIG. 1A is a schematic drawing of a lens system constructed in accordance with the first aspect of the invention.
Figure 1B:
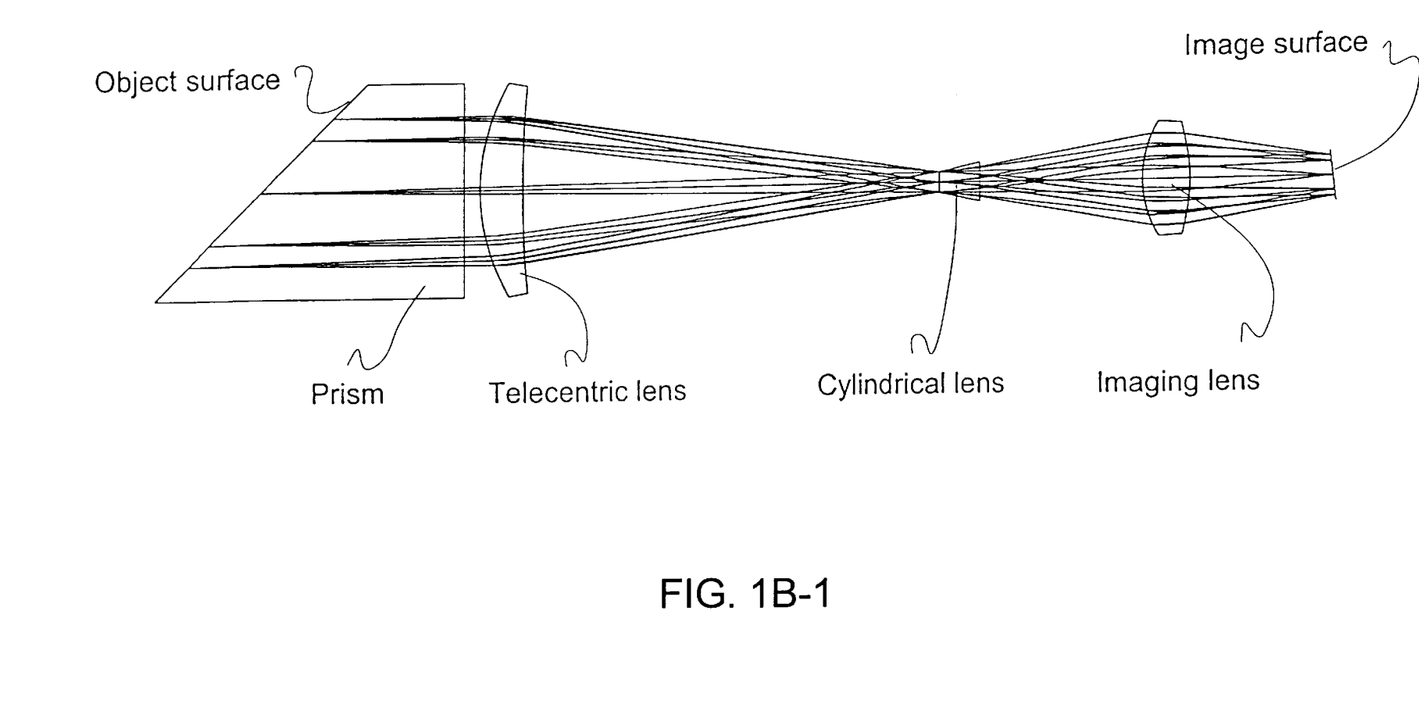
Figure 1B:
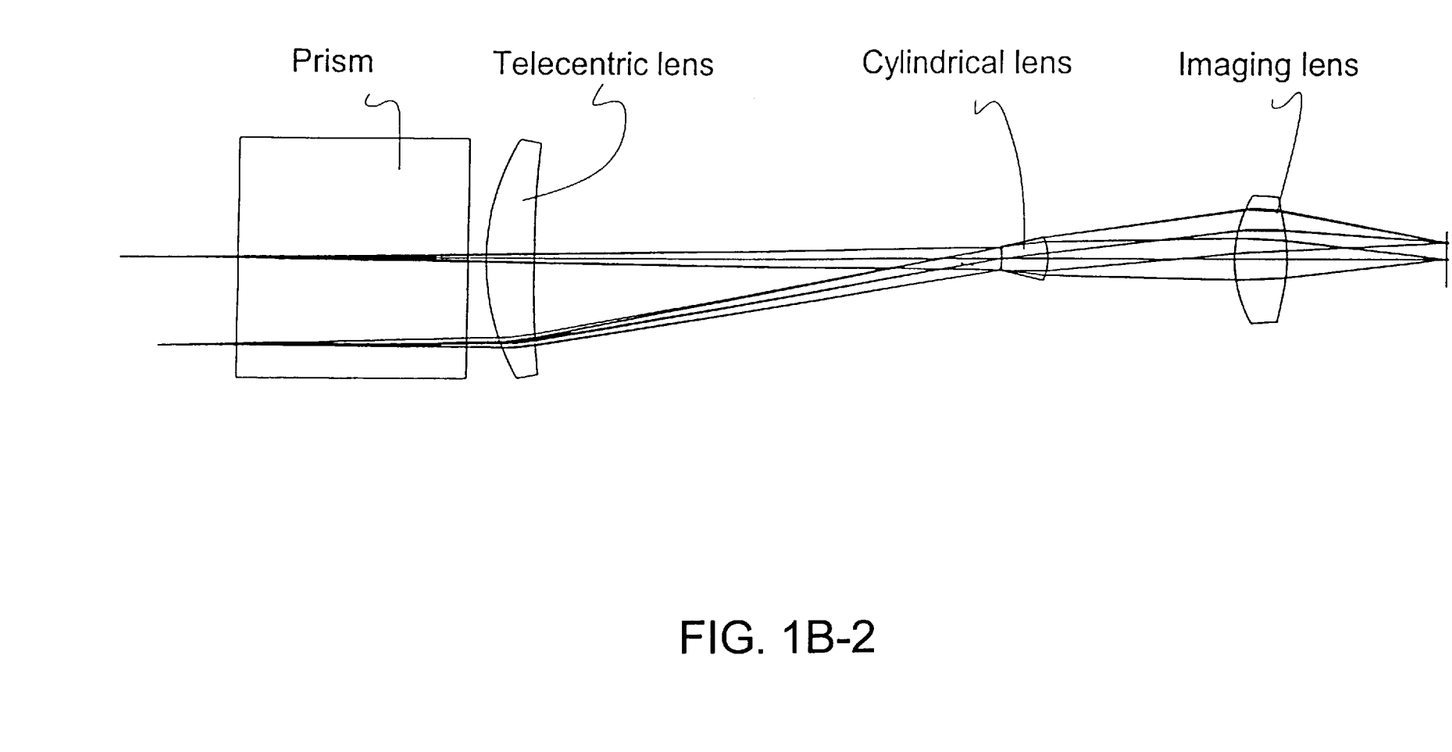
Figure 1C:
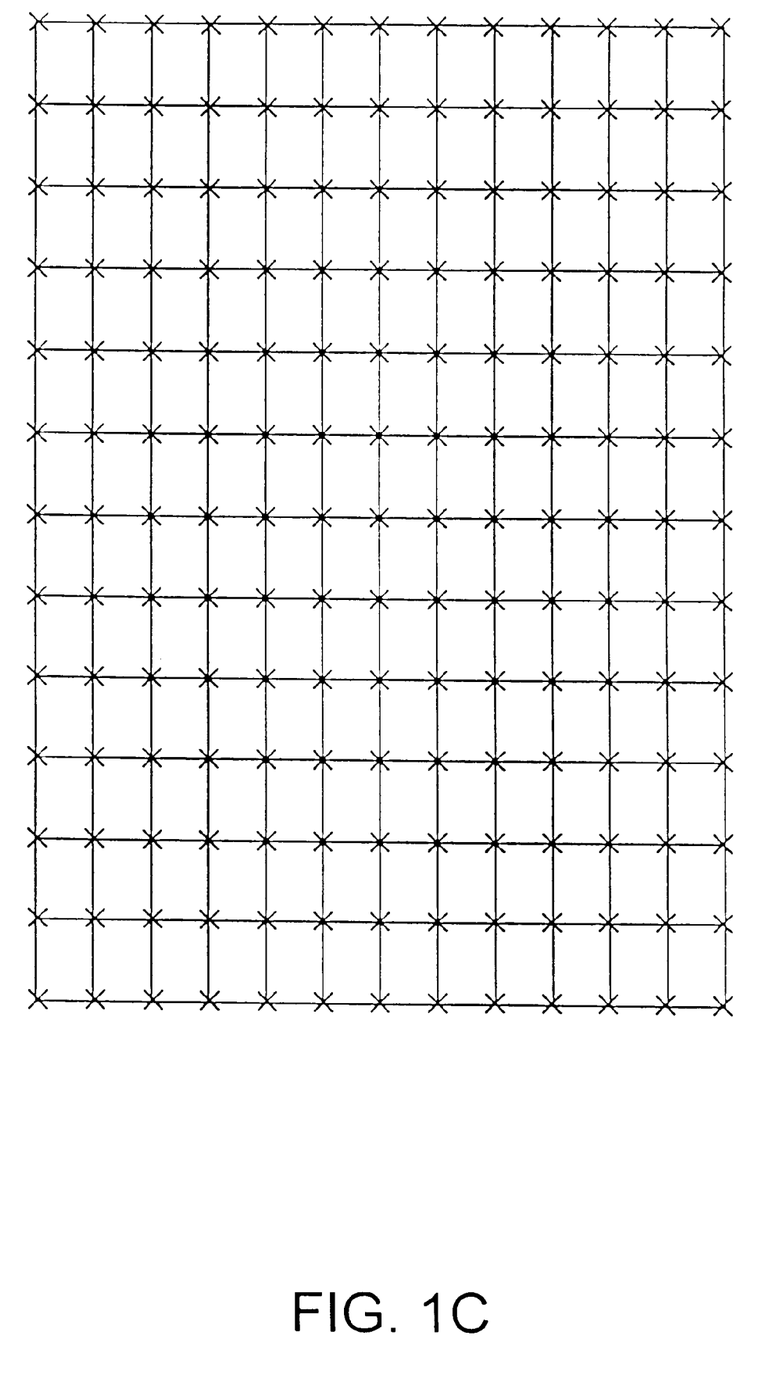
FIG. 1C is a plot of grid distortion for the lens system of FIG. 1A.
Figure 2A:
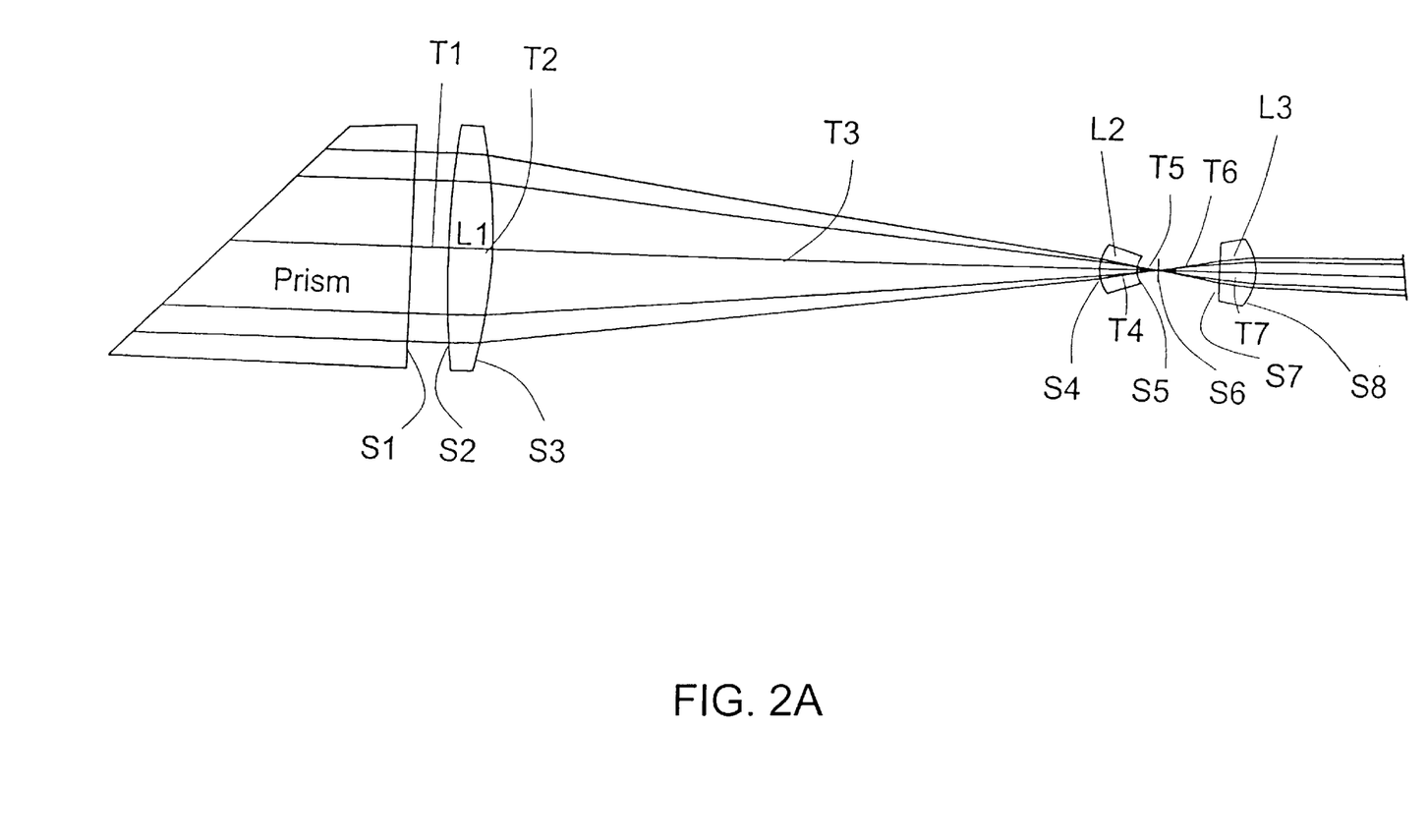
FIG. 2A is a schematic drawing of a lens system constructed in accordance with the second aspect of the invention.
Figure 2B:
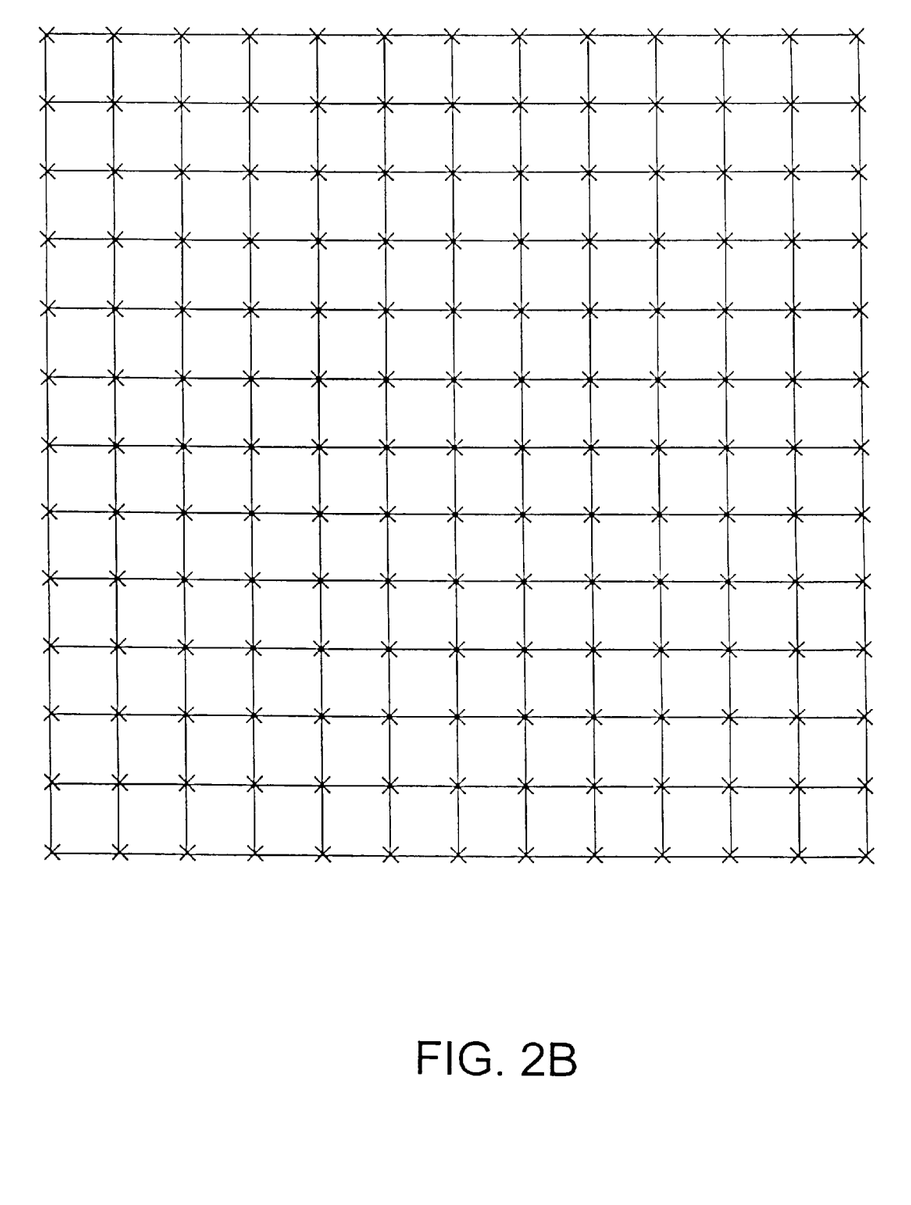
FIG. 2B is a plot of grid distortion for the lens system of FIG. 2A.
Figure 3:
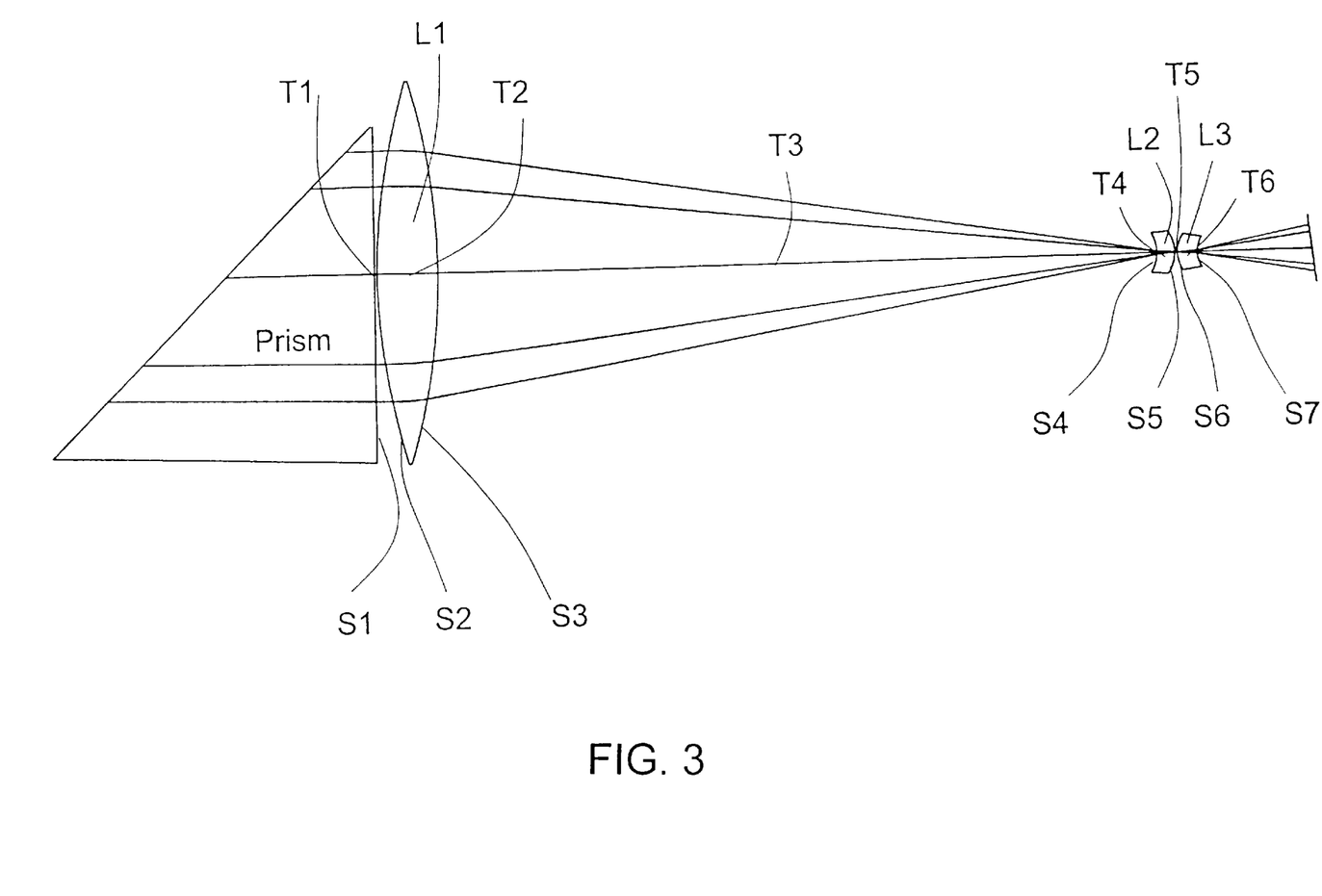
FIGS. 3–5 are schematic drawings of further lens systems constructed in accordance with the second aspect of the invention.
Figure 4:
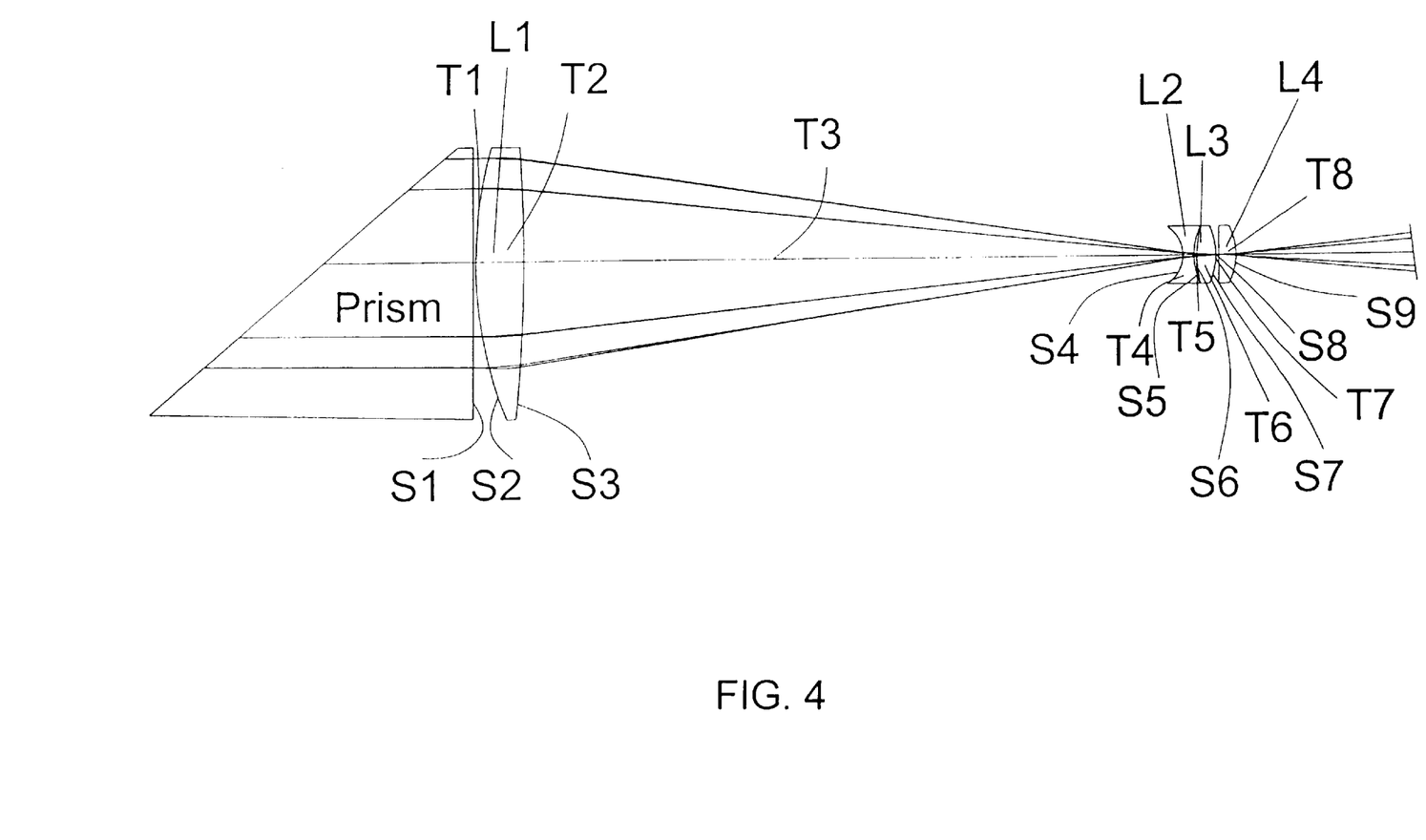
Figure 5:
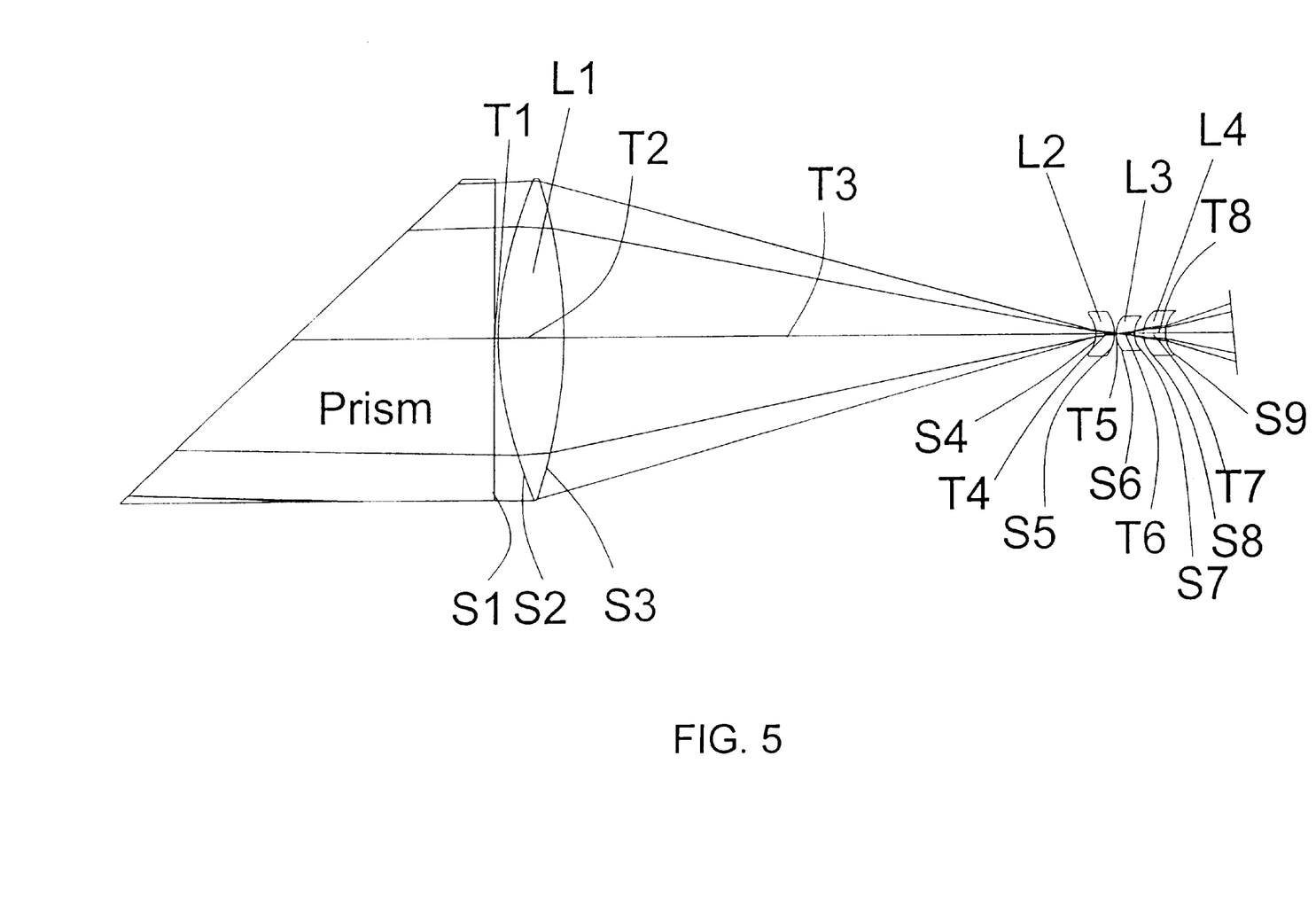

The lens systems of FIGS. 2–5 illustrate the following features of the invention: FIG. 2 illustrates the use of a conic first lens element, a spherical glass second lens element, and a molded plastic third lens element having one aspherical surface; FIG. 3 illustrates an all plastic system where each lens element has one aspherical surface; FIG. 4 illustrates an all glass spherical system; and FIG. 5 illustrates a system having a short object to image distance.

Table 6 shows the correspondence between the lens elements of FIGS. 1–5 and the first, second, and third lens units referred to above and in the claims.

Preferably the first lens unit of both the first and second embodiments of the invention has a focal length $f_1$ which is less than about 0.75 times the total track for lens systems which include an aspherical surface and less than about 1.25 times the total track for systems employing spherical lens elements. Table 7 sets forth the $f_1$ and total track values for the lens systems of Examples 1–5

Although preferred and other embodiments of the invention have been described herein, further embodiments may be perceived by those skilled in the art without departing from the scope of the invention as defined by the following claims.

TABLE 1

SYSTEM DATA

Total Track 107.593
Working F/# 5.10882
Obj. Space N.A. 0.022
Maximum Field 13.1
Primary Wave 0.650000 microns

SURFACE DATA SUMMARY

| Surf | Type | Radius | Thickness | Glass | Diameter | Conic |
|---|---|---|---|---|---|---|
| OBJ | TILTSURF | — | 25 | BK7 | 26.20408 | — |
| 1 | STANDARD | Infinity | 2 | | 26.09679 | 0 |
| 2 | STANDARD | 25.70843 | 5.2 | ACRYLIC | 26.04222 | 0 |
| 3 | EVENASPH | 231.1318 | 51.70056 | | 25.2033 | 0 |
| STO | STANDARD | Infinity | 0 | | 2.487769 | 0 |
| 5 | TOROIDAL | Infinity | 5 | BK7 | 2.556231 | 0 |
| 6 | TOROIDAL | Infinity | 20.27059 | | 4.734597 | 0 |
| 7 | STANDARD | 13.64298 | 5.8 | ACRYLIC | 13.95049 | 0 |
| 8 | EVENASPH | −18.10472 | 17.62166 | | 13.58516 | −5.661331 |
| IMA | TILTSURF | — | 0 | | 6.167979 | — |

SURFACE DATA DETAIL

Object Surface Tilted 45 degrees
Image Surface Tilted 6.5 degrees

ASPHERICAL SURFACE DATA

| Surf. | D | E | F | G | H | I |
|---|---|---|---|---|---|---|
| 3 | 1.123047E-5 | −1.738811E-8 | | | | |
| 8 | 3.954257E-5 | 1.31374E-7 | 4.264235E-8 | −2.068281E-9 | 4.132821E-11 | −3.018667E-13 |

| | | | |
|---|---|---|---|
| Surface 5 | TOROIDAL | Radius of revolution. | −3.967406 |
| Surface 6 | TOROIDAL | Radius of revolution. | −6.046119 |

TABLE 2

SYSTEM DATA

Total Track 135.915
Working F/# 4.36037
Maximum Field 15.89
Primary Wave 0.650000 microns

SURFACE DATA SUMMARY

| Surf | Type | Radius | Thickness | Glass | Diameter | Conic |
|---|---|---|---|---|---|---|
| OBJ | TILTSURF | — | 25 | BK7 | 31.78003 | — |
| 1 | STANDARD | Infinity | 5.190437 | | 32.86197 | 0 |
| 2 | STANDARD | 136.3678 | 6 | ACRYLIC | 33.13347 | 0 |
| 3 | STANDARD | −66.82787 | 83.18716 | | 32.97939 | −3.393647 |
| 4 | STANDARD | 5.478497 | 5 | K10 | 6.598144 | 0 |
| 5 | STANDARD | 3.073549 | 2.831673 | | 3.660189 | 0 |
| STO | STANDARD | Infinity | 8.328321 | | 3.099801 | 0 |
| 7 | STANDARD | 250.2192 | 5 | ACRYLIC | 7.829303 | 0 |
| 8 | EVENASPH | −9.070955 | 20.37725 | | 9.067809 | 0 |
| IMA | TILTSURF | — | 0 | | 6.134792 | — |

SURFACE DATA DETAIL

Object Surface Tilted 45 degrees
Image Surface Tilted 7.21 degrees

Surface 8 Aspherical Coefficients for powers of r
$r^2$: −0.02235599; $r^4$: 5.636344E-5; $r^6$: 9.350753E-6; $r^8$: −1.163031E-6; $r^{10}$: 8.182924E-8; $r^{12}$: −2.915787E-9; $r^{14}$: 4.1623E-11

TABLE 3

SYSTEM DATA

| | |
|---|---|
| Total Track | 70 |
| Working F/# | 4.30765 |
| Obj. Space N.A. | 0.022 |
| Maximum Field | 13.102 |
| Primary Wave | 0.650000 microns |

SURFACE DATA SUMMARY

| Surf | Type | Radius | Thickness | Glass | Diameter | Conic |
|---|---|---|---|---|---|---|
| OBJ | TILTSURF | — | 11 | BK7 | 26.20408 | — |
| 1 | STANDARD | Infinity | 0.2 | | 27.90575 | 0 |
| 2 | EVENASPH | 39.89135 | 4.473029 | ACRYLIC | 28.21343 | −5.826537 |
| 3 | STANDARD | −48.78966 | 53.56381 | | 28.19267 | 0 |
| 4 | STANDARD | −2.906349 | 1.339289 | ACRYLIC | 2.914914 | 0 |
| 5 | EVENASPH | −2.656021 | 0.2 | | 3.107117 | 0 |
| STO | STANDARD | 2.184049 | 1.523577 | ACRYLIC | 2.657442 | 0 |
| 7 | EVENASPH | 2.191862 | 8.700297 | | 2.213909 | 0 |
| IMA | TILTSURF | — | 0 | | 4.932881 | — |

SURFACE DATA DETAIL

| | |
|---|---|
| Object Surface | Tilted 45 degrees |
| Image Surface | Tilted 6.8 degrees |

ASPHERICAL SURFACE DATA

| Surf. | D | E | F | G | H | I |
|---|---|---|---|---|---|---|
| 2 | −1.676925E-6 | 5.368215E-9 | | | | |
| 5 | 0.004577377 | 0.0007814665 | −.0004157694 | 0.0001039365 | | |
| 7 | 0.004622665 | 0.008402386 | −0.005275569 | −.0002330626 | 0.006666924 | −0.003251713 |

TABLE 4

SYSTEM DATA

| | |
|---|---|
| Total Track | 70 |
| Working F/# | 4.31084 |
| Obj. Space N.A. | 0.022 |
| Maximum Field | 13.102 |
| Primary Wave | 0.650000 microns |

SURFACE DATA SUMMARY

| Surf | Type | Radius | Thickness | Glass | Diameter | Conic |
|---|---|---|---|---|---|---|
| OBJ | TILTSURF | — | 11 | BK7 | 26.20408 | — |
| 1 | STANDARD | Infinity | 0.2 | | 27.48681 | 0 |
| 2 | STANDARD | 43.31 | 3.5 | SF1 | 27.72874 | 0 |
| 3 | STANDARD | −171.85 | 49.17685 | | 27.58105 | 0 |
| 4 | STANDARD | −3.234051 | 0.8 | BK7 | 5 | 0 |
| 5 | STANDARD | 6.522 | 0.25 | | 5 | 0 |
| 6 | STANDARD | 12.474 | 1.4 | SF1 | 5 | 0 |
| 7 | STANDARD | −7.133 | 0.2 | | 5 | 0 |
| STO | STANDARD | Infinity | 1.3 | SF6 | 5 | 0 |
| 9 | STANDARD | −6.522 | 13.17316 | | 5 | 0 |
| IMA | TILTSURF | — | 0 | | 4.9432 | — |

SURFACE DATA DETAIL

Object Surface: Tilted 45 degrees
Image Surface: Tilted 6.2 degrees

TABLE 5

SYSTEM DATA

| | |
|---|---|
| Total Track | 40.1763 |
| Working F/# | 4.33983 |
| Obj. Space N.A. | 0.022 |
| Maximum Field | 13.102 |
| Primary Wave | 0.650000 microns |

SURFACE DATA SUMMARY

| Surf | Type | Radius | Thickness | Glass | Diameter | Conic |
|---|---|---|---|---|---|---|
| OBJ | TILTSURF | — | 11 | BK7 | 26.20408 | — |
| 1 | STANDARD | Infinity | 0.2 | | 22 | 0 |
| 2 | EVENASPH | 20.65035 | 3.5 | ACRYLIC | 22 | 0 |
| 3 | STANDARD | −31.72422 | 29.02133 | | 22 | 0 |
| 4 | EVENASPH | −1.70406 | 1 | ACRYLIC | 2.6 | 0 |
| 5 | STANDARD | −2.198759 | 0.1 | | 2.6 | 0 |
| STO | STANDARD | 1.547474 | 1 | ACRYLIC | 2 | 0 |
| 7 | EVENASPH | 1.829054 | 0.4824209 | | 2 | 0 |
| 8 | STANDARD | 1.755336 | 1.177711 | ACRYLIC | 2.6 | 0 |
| 9 | EVENASPH | 2.020989 | 3.694845 | | 2.6 | 0 |
| IMA | TILTSURF | — | 0 | | 4.976063 | — |

TABLE 5-continued

SURFACE DATA DETAIL

Object Surface: Tilted 45 degrees
Image Surface: Tilted 5.02 degrees

ASPHERICAL SURFACE DATA

| Surf. | D | E | F | G |
|---|---|---|---|---|
| 2 | −4.629466E-5 | −4.629466E-5 | | |
| 4 | 0.01786009 | 0.0319493 | −0.05570782 | 0.03130791 |
| 7 | 0.06001557 | 0.03785613 | −0.03016861 | 0.03552276 |
| 9 | 0.01319803 | 0.001277422 | 0.001882929 | 0.001614795 |

TABLE 6

| Example | Unit 1 | Unit 2 | Unit 3 |
|---|---|---|---|
| 1 | L1 | L3 | L2 |
| 2 | L1 | L3 | L2 |
| 3 | L1 | L2 | L3 |
| 4 | L1 | L4 | L2, L3 |
| 5 | L1 | L3, L4 | L2 |

TABLE 7

| | Ex.1 | Ex.2 | Ex.3 | Ex.4 | Ex.5 |
|---|---|---|---|---|---|
| $f_1$ | 58.6 | 92.6 | 45.6 | 71.1 | 26.1 |
| Total track | 107.6 | 135.9 | 70.0 | 70.0 | 40.2 |
| $f_1$/Total track | 0.54 | 0.68 | 0.65 | 1.0 | 0.65 |

What is claimed is:

1. An optical system having an optical axis, said system forming an image of an object and comprising:
   a) a prism having a first surface for contacting the object and a second surface, said first surface being oriented with respect to the optical axis at an angle greater than the angle of total internal reflection of the surface;
   b) an aperture stop;
   c) a first lens unit having a positive power between the aperture stop and the prism for forming a telecentric entrance pupil;
   d) a second lens unit having a positive power on the image side of the aperture stop for forming a real image of the object; and
   e) a third lens unit between the first and second lens units, said third lens unit having cylindrical power, said cylindrical power being substantially afocal.

2. The optical system of claim 1 wherein the first lens unit comprises at least one aspherical surface.

3. The optical system of claim 1 wherein the first lens unit consists of a single lens element.

4. The optical system of claim 1 wherein the second lens unit comprises at least one aspherical surface.

5. The optical system of claim 1 wherein the second lens unit consists of a single lens element.

6. The optical system of claim 1 wherein the third lens unit comprises an optical surface which is adjacent to the aperture stop.

7. The optical system of claim 1 wherein the third lens unit consists of a single lens element.

8. The optical system of claim 1 wherein the cylindrical power of the third lens unit is used to reduce the size of the image in one direction only.

9. The optical system of claim 1 wherein the cylindrical power of the third lens unit serves to reduce the field curvature of the image contributed by the first and second lens units.

10. An optical system having an optical axis, said system forming an image of an object and comprising:
    a) a prism having a first surface for contacting the object and a second surface, said first surface being oriented with respect to the optical axis at an angle greater than the angle of total internal reflection of the surface;
    b) an aperture stop;
    c) a first lens unit having a positive power between the aperture stop and the prism for forming a telecentric entrance pupil;
    d) a second lens unit having a positive power for forming a real image of the object, said second lens unit being on the image side of the first lens unit; and
    e) a third lens unit for correcting the field curvature of the image contributed by the first and second lens units.

11. The optical system of claim 10 wherein the first lens unit comprises at least one aspherical surface.

12. The optical system of claim 10 wherein the first lens unit consists of a single lens element.

13. The optical system of claim 10 wherein the second lens unit comprises at least one aspherical surface.

14. The optical system of claim 10 wherein the second lens unit consists of a single lens element.

15. The optical system of claim 10 wherein the third lens unit has a negative power.

16. The optical system of claim 10 wherein the third lens unit has an overall meniscus shape.

17. The optical system of claim 10 wherein the third lens unit comprises an aspherical surface.

18. The optical system of claim 10 wherein the third lens unit consists of a single lens element.

* * * * *